US012581390B2

(12) United States Patent
Bönig et al.

(10) Patent No.: US 12,581,390 B2
(45) Date of Patent: Mar. 17, 2026

(54) LORAWAN GATEWAY NETWORK AND METHOD

(71) Applicant: DRYAD NETWORKS GMBH, Eberswalde (DE)

(72) Inventors: Marco Bönig, Dortmund (DE); Daniel Hollos, Berlin (DE); Carsten Brinkschulte, Berlin (DE)

( * ) Notice: Subject to any disclaimer, the term of this patent is extended or adjusted under 35 U.S.C. 154(b) by 632 days.

(21) Appl. No.: 17/798,895

(22) PCT Filed: Feb. 11, 2021

(86) PCT No.: PCT/EP2021/053351
§ 371 (c)(1),
(2) Date: Aug. 11, 2022

(87) PCT Pub. No.: WO2021/160750
PCT Pub. Date: Aug. 19, 2021

(65) Prior Publication Data
US 2023/0093492 A1    Mar. 23, 2023

(30) Foreign Application Priority Data

Feb. 11, 2020    (DE) ........................ 10 2020 103 418
Feb. 11, 2021    (DE) ........................ 10 2021 103 226

(51) Int. Cl.
H04W 40/24        (2009.01)
G08B 17/00        (2006.01)
(Continued)

(52) U.S. Cl.
CPC ........ H04W 40/246 (2013.01); G08B 17/005 (2013.01); G08B 17/117 (2013.01);
(Continued)

(58) Field of Classification Search
CPC ... G08B 17/005; G08B 17/117; H04L 1/1607; H04W 4/12; H04W 4/38; H04W 4/70;
(Continued)

(56) References Cited

U.S. PATENT DOCUMENTS

2017/0230074 A1    8/2017    Rose et al.
2017/0230907 A1    8/2017    Rose et al.
(Continued)

FOREIGN PATENT DOCUMENTS

CN        107659889        2/2018
CN        109041272        12/2018
(Continued)

OTHER PUBLICATIONS

Dwijaksara Made Harta et al "Multihop gateway-to-gateway communication protocol for LoRa networks" 2019 IEEE International Conference on Industrial Technology (ICIT), 2019, pp. 949-954, doi: 10.1109/ICIT.2019.8755136. Feb. 13, 2019.
(Continued)

*Primary Examiner* — Awet Haile
(74) *Attorney, Agent, or Firm* — JMB DAVIS BEN-DAVID

(57)        ABSTRACT

The invention relates to a method for communication in a LoRaWAN mesh gateway network, wherein the LoRaWAN mesh gateway network has a plurality of end devices, a plurality of gateways and a network server. Here, one of the gateways performs server functions of the communication method that are intended for the network server (NS) according to the LoRaWAN protocol.

21 Claims, 9 Drawing Sheets

Figure 1:
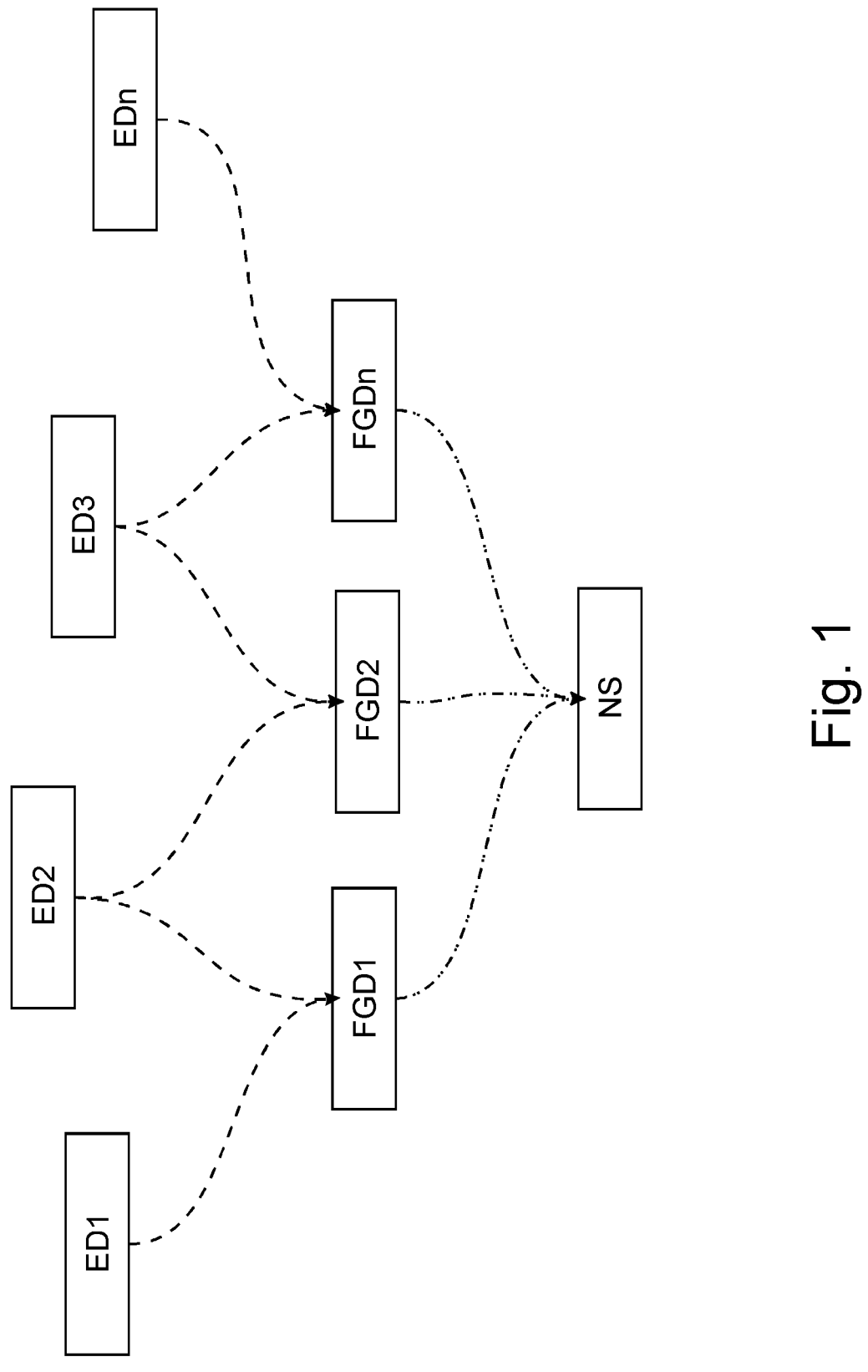

(51) Int. Cl.

| | | |
|---|---|---|
| *G08B 17/117* | (2006.01) | |
| *H04L 1/1607* | (2023.01) | |
| *H04W 4/12* | (2009.01) | |
| *H04W 4/38* | (2018.01) | |
| *H04W 84/18* | (2009.01) | |
| *H04W 88/16* | (2009.01) | |

(52) U.S. Cl.
CPC .............. *H04L 1/1607* (2013.01); *H04W 4/12* (2013.01); *H04W 4/38* (2018.02); *H04W 84/18* (2013.01); *H04W 88/16* (2013.01)

(58) Field of Classification Search
CPC ... H04W 40/246; H04W 84/18; H04W 88/16; Y02A 40/28; Y02D 30/07
See application file for complete search history.

(56) References Cited

U.S. PATENT DOCUMENTS

| | | | | |
|---|---|---|---|---|
| 2018/0176718 A1* | 6/2018 | VerSteeg | ............... | G01S 5/0244 |
| 2019/0335525 A1* | 10/2019 | Liu | ......................... | H04L 45/48 |
| 2020/0007277 A1* | 1/2020 | Teboulle | ............... | H04L 5/0098 |
| 2020/0344847 A1* | 10/2020 | Nardini | ................. | H04W 84/18 |
| 2021/0136869 A1* | 5/2021 | Radmand | .............. | H04W 84/18 |

FOREIGN PATENT DOCUMENTS

| | | |
|---|---|---|
| CN | 109495512 | 3/2019 |
| DE | 102017117170 | 8/2018 |
| WO | 2018224740 | 12/2018 |

OTHER PUBLICATIONS

LoRa Alliance, "LoRaWAN Backend Interfaces 1.0 Specification" Oct. 11, 2017, 75 pages.

Misbahuddin et al, "Multi-hop Uplink for Low Power Wide Area Networks Using LoRa Technology", 2019 6th International Conference on Information Technology, Computer and Electrical Engineering (ICITACEE), IEEE,26. Sep. 2019 (Sep. 26, 2019).

LoRa Alliance, "LoRaWAN 1.1 Specification" Oct. 11, 2017, 102 pages.

Jeferson Rodrigues Cotrim et al., "LoRaWAN Mesh Networks: A Review and Classification of Multihop Communication", Sensors 2020, 20, 4273, pp. 1-21. Jul. 2020.

LoRa Alliance, "LoRaWAN: What is it?", A technical overview of LoRa and LoRaWAN, Technical Marketing Workgroup 1.0, Nov. 2015, pp. 1-20.

\* cited by examiner

LORAWAN GATEWAY NETWORK AND METHOD

CROSS-REFERENCE TO RELATED APPLICATIONS

This is the U.S. National Stage of International Patent Application No. PCT/EP2021/053351 filed Feb. 11, 2021, which claims priority to German Patent Application No. 10 2020 103 418.0 filed Feb. 11, 2020, and German Patent Application No. 10 2021 103 226.1 filed Feb. 11, 2021.

The invention relates to the extension of a Low Power Wide Area Network (LPWAN), especially a Long Range Wide Area Network (LoRaWAN), a specification for wireless battery-powered systems in a regional, national or even global network. LoRaWAN serves the key requirements of the Internet of Things (IoT), in particular secure bidirectional communication, localisation and mobility. The LoRaWAN specification is a layered protocol (Media Access Control MAC) and is designed for large public networks with a single operator. It is based on the LoRa modulation scheme of the company Semtech and offers seamless cooperation of different systems and techniques without the need for inflexible, local, complex installations.

The network architecture of LoRaWAN is typically built in a star topology, with gateways acting as transparent bridges that relay messages between end devices and a central network server, end devices and back-end. The gateways are connected to a corresponding network server via a standard IP connection, while the end devices use single-hop wireless communication (LoRa) to one or more gateways. The endpoint communication is usually bidirectional and also supports the operation of, for example, multi-cast enabling software upgrade over the air or other ways for bulk distribution of messages to reduce transmission time over the air communication. Communication between gateways and end devices is spread over different data rates and frequency channels, where the choice of data rate is a trade-off between message duration and communication range. Through so-called spread spectrum technology, communications at different data rates do not interfere with each other, creating a series of virtual channels that increase the capacity of the respective gateways. LoRaWAN data rates range from 0.3 kbps up to 50 kbps. To maximise the battery life of the overall network capacity and end devices, the LoRaWAN network server manages the RF output and data rate for all end devices individually using an adaptive data rate scheme. While LoRaWAN defines the communication protocol and system rights for the network, the LoRa layer enables a wide-range wireless communication link. LoRa involves wireless communication with very low power consumption. LoRaWAN refers to a network protocol using LoRa chips for communication and is based on a base station that can monitor eight frequencies with multiple spreading factors with almost 42 channels. With its star topology (LoRaWAN) and energy-saving signal transmission technology (LoRa), the LoRaWAN network technology is specifically designed for the energy-efficient and secure networking of end devices in the Internet of Things and is also particularly suitable for outdoor use.

This Internet of Things places various demands on the network technology used. The architecture is designed for thousands of end devices, which can be located far away, in populated and non-populated areas and in places that are difficult to access, and includes sensors that monitor the water flow or irrigation systems, as well as consumption meters and much more. The requirements of the outdoor application must safely support battery-powered end devices while greatly simplifying installation and maintenance, thus only communication operation can be considered. Strict power consumption specifications for end devices must also be taken into account, as they must operate for several years on a single battery only.

LoRa has particularly low energy consumption and is based on chirp frequency spread modulation in accordance with U.S. Pat. No. 7,791,415 B2. Licences for use are issued by the company Semtech. LoRa uses licence-free communication frequencies in the range below 1 GHz, such as 433 MHz and 868 MHz in Europe or 915 MHz in Australia and North America, and thus enables a range of more than 10 kilometres in rural areas with very low energy consumption. LoRa technology consists on the one hand of the physical LoRa protocol and on the other hand of the LoRaWAN protocol, which is defined and managed as the upper network layer by the industry consortium "LoRa Alliance". LoRaWAN networks implement a star-shaped architecture by means of gateway message packets between the end devices and the central network server. The gateways (also called concentrators or base stations) are connected to the network server via the standard internet protocol, while the end devices communicate with the respective gateway via communication using LoRa (chirp Spread Spectrum modulation) or FSK (frequency modulation). The communication connection is thus a single-hop network in which the end devices communicate directly with one or more gateways, which then forward the data traffic to the internet. Conversely, the data traffic from the network server to an end device is only routed via a single gateway. Data communication basically works in both directions, but data traffic from the end device to the network server is the typical application and the predominant mode of operation. By bridging greater distances with very low energy consumption, LoRaWAN is particularly suitable for IoT applications outside of residential areas, such as for automatic irrigation systems or the measurement of environmental parameters in agriculture.

At the physical level, LoRaWAN, like other communication protocols for IoT applications, uses spread spectrum modulation. It differs by using an adaptive technique based on chirp signals, in difference to conventional DSSS (direct sequence spread spectrum signaling). Chirp signals offer a compromise between reception sensitivity and maximum data rate. A chirp signal is a signal whose frequency varies over time. LoRaWAN technology is inexpensive to implement because it does not rely on a precise clock source. The ranges of LoRa extend up to 40 kilometres in rural areas. In the city, the advantage is good building penetration, as even basements can be reached. The power requirement is very low, at around 10 nA and 100 nA in stand-by mode. Thus, a battery life of up to 15 years is achievable.

In addition to the physical layer, LoRa/LoRaWAN defines two further layers. Layer 2 is the LoRaWAN link layer, which provides basic message integrity protection based on cyclic redundancy checks and enables basic point-to-point communication. The third layer adds the network protocol function, which is defined by LoRaWAN. The LoRaWAN protocol allows end devices to send data to and receive data from the internet, especially to and from a cloud application, using a gateway (also called a concentrator or base station).

There are different variants for the end devices. Class A includes communication according to the ALOHA access procedure. With this procedure, the device sends its generated data packets to the gateway, followed by two download-receive windows, which can be used for a data reception. A new data transfer can only be initiated by the end devices during a new upload. Class B end devices, on the other hand, open download receive windows at specified times. For this purpose, the end device receives a time-controlled beacon signal from the gateway. In this way, a network server knows when the end device is ready to receive data. Class C end devices have a permanently open download receive window and are thus permanently active, but also have increased power consumption.

LoRaWAN uses a star network architecture in which all end devices communicate via the most appropriate gateway. These gateways take care of routing and, if there is more than one gateway within range of an end device and the local network is overloaded, they can also redirect communication to an alternative.

Some other IoT protocols (for example ZigBee or Z-Wave), on the other hand, use so-called mesh network architectures to increase the maximum distance of an end device from a gateway. The end devices of the mesh network forward messages to each other until they reach a gateway, which transmits the messages to the internet. Mesh networks are self-programming and adapt dynamically to environmental conditions without the need for a master controller or hierarchy. However, in order to be able to forward messages, the end devices of a mesh network must be ready to receive either constantly or at regular intervals and cannot be put into stand-by for long periods of time. The consequence is a higher energy demand of the end devices for forwarding messages to and from the gateways as well as a resulting shortening of the battery life.

The star network architecture of LoRaWAN, on the other hand, allows the end devices (especially class A and B) to put themselves into the power-saving stand-by mode over long periods of time and thus ensures that the battery of the end devices is loaded as little as possible and can thus be operated for several years without changing the battery. The gateway acts as a bridge between simple protocols optimised for battery life (LoRa/LoRaWAN), which are more suitable for resource-constrained end devices, and the Internet Protocol (IP), which is used to provide IoT services and applications. After the gateway receives the data packets from the end device via LoRa/LoRaWAN, it sends them via the Internet Protocol (IP) to a network server, which in turn has ports to IoT platforms and applications.

However, existing LoRaWAN networks also have undesirable limitations. One such limitation is in particular the use of the standard IP protocol between gateway and network server. Especially when used in rural areas, where network coverage for mobile communication (3G, 4G/LTE or even 5G) is sparse or non-existent and a wired internet connection would be too costly, a gateway often cannot be operated due to the lack of an internet connection. LoRa networks can therefore so far only be used where the maximum communication range between the gateway connected to the internet and the end devices is not exceeded. Due to the star network architecture, the range of a LoRaWAN network is thus limited to the maximum range of the single-hop connection between the gateway and the end device. This limitation applies in particular to remote, rural areas where there is neither a wired internet connection nor suitable mobile network coverage (5G, 4G/LTE, 3G).

It is already known that the range of communication networks can be increased by meshing the end devices and thus the range limitation of a single communication connection can be lifted. In these so-called meshed multi-hop networks, the end devices talk to each other and pass the data among themselves without any special hierarchy until an end device can finally pass the data to a gateway.

Although the implementation of such a meshed multi-hop communication network in the end devices solves the problem of range limitation from the gateway to the end device by forwarding the data packets from one end device to another end device, it is not compatible with the LoRaWAN specification because special end devices with an additional meshed function are used here. Since standard LoRaWAN end devices can only contact a gateway directly and are not able to communicate directly with other end devices, standard LoRaWAN end devices cannot operate with this range extension. Range extension by implementing a meshed multi-hop communication network in the end devices is therefore not compatible with the LoRaWAN network standard.

An example of this is the development platform for LoRa end devices from the company PyCom (LoPy4 and FiPy), with which a multi-hop communication network can be implemented in the LoRa end devices, analogous to ZigBee or Z-Wave. Although this development platform can solve the problem of range limitation from the end device to the gateway by forwarding the data packets from one end device to another, it is not compatible with the LoRaWAN specification because it allows the mesh function to work only between end devices based on LoPy4 or FiPy. Existing LoRaWAN end devices cannot benefit from this range extension as they can only contact a gateway directly and are not able to communicate with the gateway indirectly across other end devices.

One approach for implementing a mesh network architecture in the field of WiFi is the 802.11s standard, which defines a deterministic access procedure for WLAN networks that uses time segments instead of competing access to the shared medium. For routing between nodes, 802.11s does not use an IP routing protocol, but the MAC layer, in order to take into account the specific and changing characteristics of the communication link. A hybrid wireless mesh protocol developed specifically for mesh is usually used here. The 802.11s standard provides for the installation of dozens of access points that are connected to each other only by radio. Forwarding via several access points, also known as multi-hop, is the rule. In extreme cases, only one of these needs to be connected to a LAN or WAN. Each node can perform one, two or three different network functions: Mesh points pass data to the next node, mesh access points exchange data with end devices and mesh point portals form the gateways to the wired network world. For the end devices, the mesh network appears like a simple WLAN. Since the 802.11s standard is defined for WLAN network architectures, it is not possible to apply this standard directly to LoRaWAN networks, which in turn are based on the LoRa communication standard.

An advantageous solution to increase the range limitation of LoRaWAN networks without having to accept incompatibility with existing LoRaWAN end devices is the implementation of a mesh functionality in the gateways. If LoRaWAN networks are extended with mesh gateways, a larger range or area coverage can be realised in areas without access to the Internet with a LoRaWAN network. This only requires individual gateways that are connected to the network server via an IP protocol. Since the communication protocol between gateways and end devices can remain unchanged, this solution approach maintains compatibility with existing LoRaWAN end devices and does not require any adaptation of the end devices to the mesh functionality. However, an unlimited network size is not possible here either, because according to the LoRaWAN protocol, class A end devices only have two receive windows and therefore the time span in which they expect a response is limited. If this time is exceeded, a timeout error occurs and communication with at least this one end device breaks down. The maximum size of such a LoRaWAN mesh gateway network is thus limited to a few hops due to the runtime extension of the responses.

The objective of the invention therefore is to provide a solution for range limitation of LoRaWan networks, with which existing LoRaWAN-compatible end devices also benefit from range extension without having to implement additional functions in the end devices or being limited to class C end devices when using the end devices and at the same time to solve the limitations of transit time extension for responses.

To solve this problem, the present invention proposes a method for communication in a LoRaWAN mesh gateway network, in which the LoRaWAN mesh gateway network has multiple end devices, multiple gateways and a network server (NS), and one of the gateways performs server functions of the communication method that are actually intended for the network server according to the LoRaWAN protocol. If the LoRaWAN standard is applied in a mesh network architecture, in which not all gateways have a single-hop connection to the network server anymore, but the communication takes place via intermediate mesh gateways, long transit times of messages between the end devices and the network server may occur. As a result of these long transit times, a server message from the network server may now fail to reach an end device within the two receive windows specified by the LoRaWAN protocol, resulting in a time-out error on the end device. By having a gateway take over communication functions of the network server, message transit times can be shortened and time-out errors of the end device can be avoided. By means of the method according to the invention, it is also ensured that the server messages of the network server to an end device are correctly sent to the end device. The end device does not require to have a permanently active download receive window and therefore be permanently active, as in the case of a class C end device, but can also be, for example, a class A or B end device according to the LoRaWAN specification. The power consumption and service life of the end device are thus increased.

In a further embodiment of the method according to the invention, the LoRaWAN mesh gateway network has a first gateway and a second gateway, wherein the first gateway does not have a single-hop connection to the network server, and wherein the server functions of the communication method are performed by the first gateway. The advantage in using differently equipped gateways is cost. Not all gateways need to have all the functions required in the LoRaWAN mesh gateway network. If the respective gateways are equipped with those functions that they need at their position in the LoRaWAN mesh gateway network, considerable costs can be saved.

In a further embodiment of the method according to the invention, a message of an end device message generated by an end device and sent to the gateway is stored on the gateway. This function is reserved for servers in standard LoRaWAN networks, but is performed here by the gateway itself. Preferably, the gateway closest to the end device stores the end device message. This reduces the length of the communication times and thus avoids time-out errors on the end device.

In an alternative embodiment of the invention, the end device message stored on the gateway is not deleted from the gateway's memory until a network server message associated with the end device message has been sent to the end device. In this way, the gateway knows which end device message has previously gone unanswered by the network server, which end device may be in error mode as a result of a time-out.

In a further embodiment of the invention, in the method for communication in a LoRaWAN mesh gateway network, a server message generated by the network server and sent to the gateway is stored on the gateway. If the gateway were to forward the server message immediately, the message would potentially reach the end device outside of a receive window, i.e., while the end device is not ready to receive. The end device would not receive the server message.

In a further embodiment of the method according to the invention, the server message stored on the gateway is not deleted from the memory of the gateway until an end device message associated with the server message has been received by the gateway. In an optional embodiment of the method according to the invention, the server message stored on the gateway is not deleted from the memory of the gateway until the stored server message has been sent from the gateway to the end device. Typically, the end devices are configured to resend an end device message after the time-out error has expired. If the server message associated with the end device message has arrived and been stored on the gateway in the meantime, it is retrieved from memory and sent to the end device. The server message is not deleted from the gateway until after the new end device message has been received on the gateway and the server message has been sent from the gateway to the end device.

In a further embodiment of the invention, the server message stored on the gateway is sent from the gateway to the end device within a receive window of the end device. This ensures that the end device is also ready to receive.

In a further embodiment of the invention, the receive window of the end device is a receive window generated by a repeated sending of an end device message to the gateway. After a time-out, an end device attempts to resend the end device message, as a result of which two new receive windows open according to the LoRaWAN protocol, in which the end device is ready to receive.

In a further embodiment of the invention, repeated sending of an end device message to the gateway occurs after a time-out of the end device. During the time-out of the end device, no reception of messages by the end device is possible. Therefore, the server message must be sent afterward to be received by the end device. In an optional further development, this end device time-out has occurred as a result of an unanswered end device message within the two receive windows defined according to the LoRaWAN protocol.

gateway message is generated on the gateway. Since a time-out error can occur on the end device if the path from the end device to the network server is too long, another option is to generate a gateway message directly on the gateway instead of delayed reception of a server message. The gateway message has the same contents and the same function as the server message. The gateway message ensures that a message from the end device to a gateway is correctly sent to the gateway. The end device does not have to have a permanently active download receive window and therefore be permanently active, as in a Class C end device, but can also be, for example, a Class A or B end device according to the LoRaWAN specification. The power consumption and the service life of the end device are thus increased.

In an embodiment of the invention, the gateway message is generated directly after the end device message is received by the end device on the gateway. Optionally, the end device message is a message to which the end device expects a response from the network server according to the LoRaWAN protocol. Thus, the gateway message is available as an alternative to the server message directly when the end device expects a server message.

In a further embodiment of the invention, the end device message is forwarded from the gateway to the network server or another gateway to ensure that the network server receives the for it intended end device message from the end device.

In another embodiment of the invention, the first gateway forwards the message to a second gateway and/or the network server. This achieves range extension of LoRaWAN networks by interconnecting the multi-hop network using gateways, thus maintaining full compatability to the LoRaWAN specification. At least one gateway communicates with the network server via a standard IP connection and using the LoRaWAN protocol.

In an alternative embodiment of the invention, the gateway message is sent to the end device. In an optional further embodiment of the invention, the gateway message is sent from the gateway to the end device within the receive windows defined by the LoRaWAN protocol. This prevents the end device from timing out as a result of the server message not being sent to the end device during the receive windows. Receipt of the gateway message completes the send operation on the end device, and the end device resumes its assigned function. In an optional further embodiment of the invention, the gateway message is sent from the gateway to the end device within the receive windows defined by the LoRaWAN protocol.

In a further embodiment according to the invention, the gateway message is sent to the end device and/or the end device message is sent to the gateway via a single-hop connection. The connection from the end device to the gateway is therefore a direct connection with only one hop of the data packet (the message). In this case, the network server can be reached by the end device via a multi-hop connection. This ensures that the gateway message is generated on a nearby gateway and reaches the end device safely within the open receive window.

In a further embodiment of the invention, the gateway message is generated and/or sent by a first gateway. Optionally, at least a second gateway communicates with the network server IP connection. The use of gateways adapted in function to the local demand offers the possibility to save considerable costs especially in very large LoRaWAN mesh gateway networks.

In another embodiment of the invention, the network communicates with the network server over a standard IP connection using the LoRaWAN protocol. This provides full compatibility. The invention enables range extension of LoRaWAN networks by interconnecting a multi-hop network using first gateways, thus maintaining full compatibility to the LoRaWAN specification. For this purpose, at least one gateway is provided to communicate with the network server via a standard IP connection and using the LoRaWAN protocol.

In another embodiment of the invention, at least one first gateway communicates with at least one second gateway via a wireless point-to-point link. The first gateways and the second gateways are interconnected via a meshed multi-hop network, so that the first gateway does not require a direct connection while communicating with the end devices. This simultaneously extends the range of the LoRaWAN network because the first gateway is connected to the second gateway via the meshed multi-hop network and can thus forward the data from the end devices to the Internet network server.

In a further embodiment of the invention, at least one of the first gateways communicates with at least one of the second gateways via a wired network connection. The wired connection is particularly insensitive to interference radiation and is therefore a reliable option for connection.

In a further embodiment of the invention, at least one of the first gateways communicates with at least one of the second gateways via a WLAN network. The first gateways and the second gateways are interconnected via a meshed multi-hop wireless network. The WLAN network uses time slices rather than concurrent access.

In a further embodiment of the invention, at least one of the first gateways communicates with at least one of the second gateways via an LTE network. Due to the use of an LTE network, compatibility with a standardized mobile network is realized.

An ACK generation unit in the sense of the present invention is a sub-server unit integrated into a gateway that performs functionalities and objectives intended for the network server according to the LoRaWAN protocol. ACK signals in the sense of the present invention are messages, commands and functions stored on the gateway or generated by a gateway. They may include the following LoRaWAN protocol MAC commands (LoRaWAN 1.1 specification dated Oct. 11, 2017, Final Release):

Confirmed Uplink (UL)—best effort
Confirmed UL—end-to-end confirmation for mission-critical messages
Downlink (DL)
Confirmed DL
ResetInd, ResetConf (Sec. 5.1)
LinkCheckReq, LinkCheckAns (Sec. 5.2)
RekeyInd, RekeyConf (Sec. 5.10)
DeviceTimeReq, DeviceTimeAns (Sec. 5.12)
Join-request, Join-accept (Sec. 6.2.2, 6.2.3)

The problem is further solved by means of a LoRaWAN mesh gateway network according to claim 21. Advantageous embodiments of the invention are shown in the dependent claims.

To solve this problem, the present invention proposes that a LoRaWAN mesh gateway network comprises at least one network server, multiple gateways, and multiple end devices. According to the invention, at least one gateway comprises a sub-server unit. The sub-server unit is adapted, for example, to generate a gateway message. This may be, for example, an ACK signal used in a data transmission to acknowledge receipt of a data packet. The gateway message ensures that a message from the end device to a gateway is correctly sent to the gateway. The end device does not require to have a permanently active download receive window and therefore be permanently active, as in a Class C end device, but can also be, for example, a Class A or B end device according to the LoRaWAN specification. The power consumption and the service life of the end device are thus increased.

In another embodiment of the invention, the sub-server unit has a processor and a memory. The processor and memory are standard components and therefore inexpensive to manufacture. The sub-server unit is further provided with a program and/or operating system and/or firmware suitable therefore. To perform functionalities intended for the network server according to LoRaWAn protocol.

In an advantageous embodiment of the invention, the LoRaWAN mesh gateway network has different gateway types. The gateway types differ in terms of their communication ports for communicating with other gateways, a network server, or end devices, and the resulting type of communication.

In another embodiment of the invention, the LoRaWAN mesh gateway network has a first gateway and a second gateway. The division of the gateways into first gateways and second gateways significantly extends the range of the LoRaWAN network, while still allowing the use of standard LoRaWAN-compatible end devices that can be distributed and networked far into impassable areas that cannot be reached by standard wireless networks.

In an advantageous embodiment of the invention, the first gateway comprises the sub-server unit. The first gateway communicates with other gateways as well as with one or more end devices. By means of sending a gateway message from a first gateway to an end device, for example, it is ensured that a message from the end device to a gateway is correctly sent to the gateway. The end device does not have to have a permanently active download receive window and therefore be permanently active, as in the case of a class C end device, but can also be, for example, a class A or B end device according to the LoRaWAN specification. The power consumption and the operating time of the end device are thus increased.

In another embodiment of the invention, the first gateway has a first gateway communication port for communicating with an end device and a second gateway communication port for communicating with another first gateway and/or a second gateway. The first gateways and the second gateways are connected to each other by means of the first communication port via a multi-hop meshed network, so that the first gateway does not require a direct connection while communicating with the end devices. End devices are directly connected to a first gateway by means of a single-hop communication network via the second communication port.

In a further embodiment of the invention, each first gateway is capable of wireless point-to-point communication with a plurality of end devices using single-hop LoRa or FSK communication using the LoRaWAN protocol. This allows the network according to the invention and its components (gateways, end devices) to be distributed and networked far into impassable areas that cannot be reached by conventional communication networks.

In another embodiment of the invention, the first gateway and the second gateway are combined with a plurality of mesh gateway devices and at least one of the mesh gateway devices does not have a direct IP connection. The first gateways and the second gateways are interconnected via a multi-hop meshed network, such that the first gateway does not require a direct connection. The invention enables range extension of LoRaWAN networks by interconnecting a multi-hop network using the first gateways, thus maintaining full compatibility to the LoRaWAN specification.

In another embodiment of the invention, a second gateway is provided for communicating with the network server using a standard IP connection and using the LoRaWAN protocol. The network communicates with the network server at a standard IP connection using the LoRaWAN protocol. This increases the range of the network when compatible with the LoRaWAN protocol.

In another embodiment of the invention, the second gateway has a first gateway communication port for communicating with a network server and a second gateway communication port for communicating with a first gateway. The two gateway communication ports differ in terms of their communication ports for communicating with other gateways, a network server, and the resulting type of communication.

In another embodiment of the invention, the first gateways are each integrated with a second gateway in a mesh gateway. The first gateway and the second gateway are combined in one device. Here, the integrated first gateway converse with each other by means of a multi-hop wireless network, while at least one integrated second gateway is connected to the network server NS via the standard Internet protocol.

wireless network. Gateways are connected to each other via a meshed multi-hop network so that the gateway does not need a direct connection while communicating with the end devices. This simultaneously extends the range of the LoRaWAN network because the gateways are connected to each other via the meshed multi-hop network, allowing them to relay data from the end devices to the Internet network server. This removes the range limitation provided by the LoRaWAN standard of a direct connection between the end device and the gateway.

The invention is explained in more detail hereinafter exemplified by the drawings. These show in FIG. 1 Standard LoRa network FIG. 2 Sequence diagram of the standard LoRaWAN network.

Figure 3:
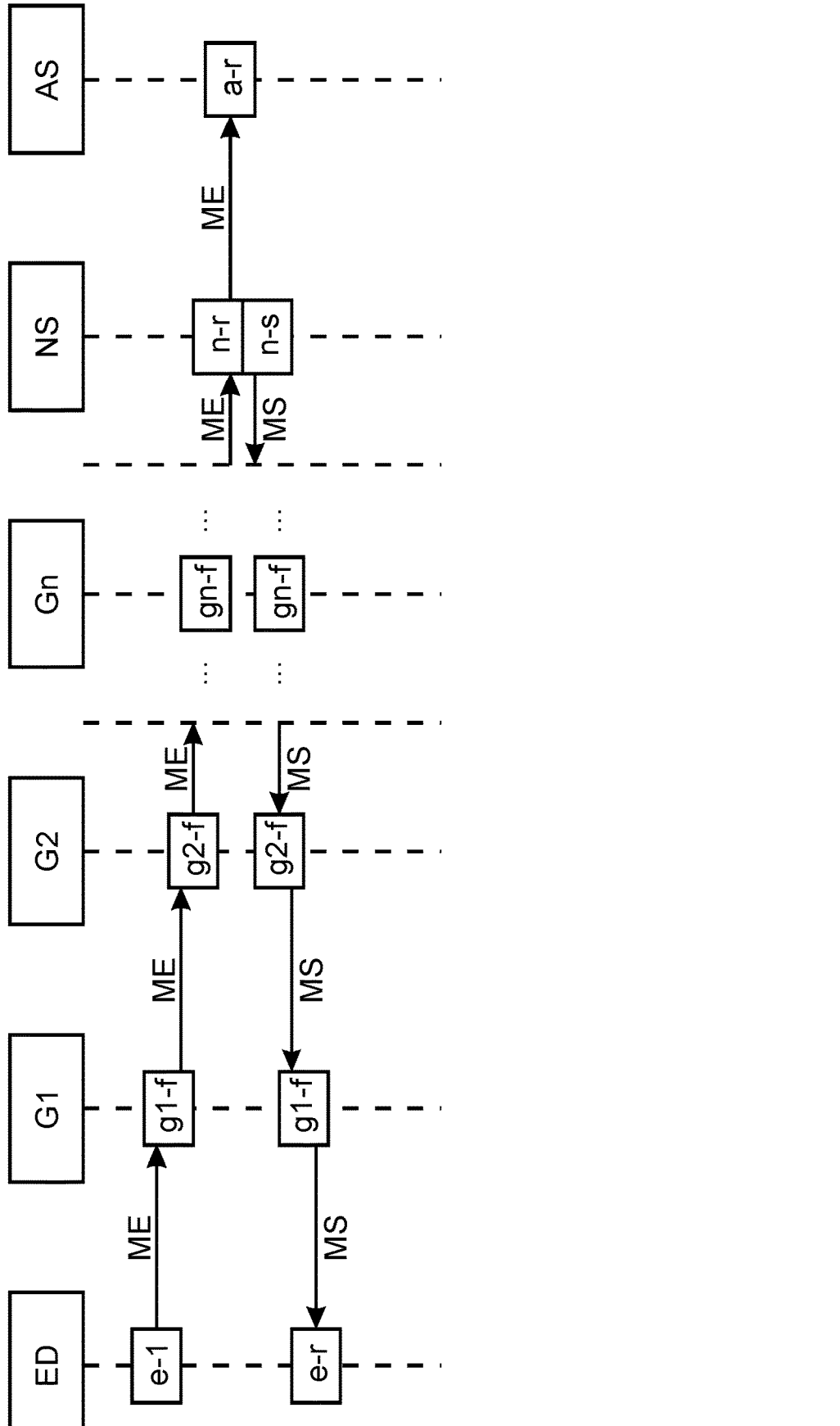

FIG. 3 Sequence diagram of LoRaWAN mesh gateway network

Figure 4:
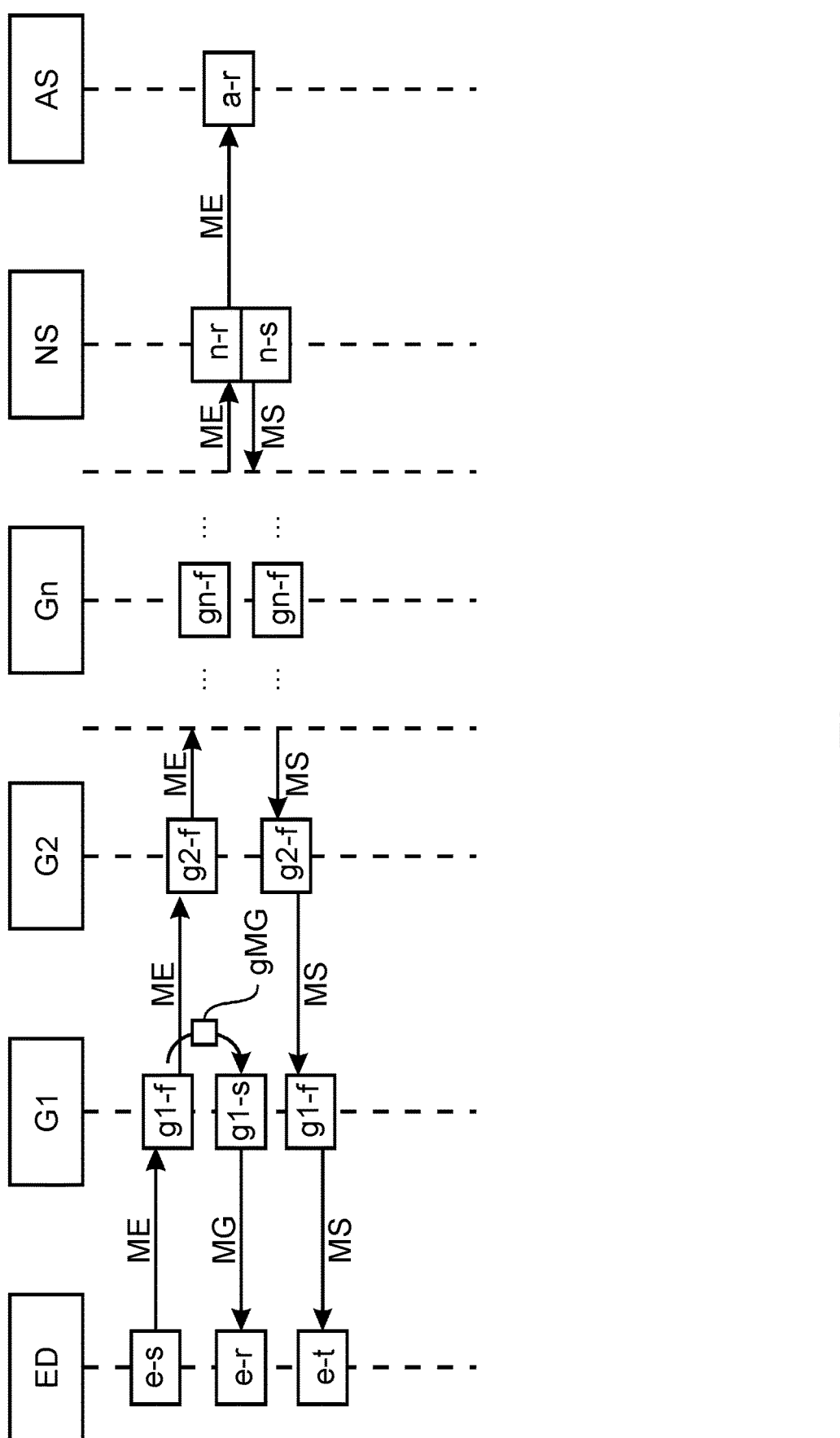
Figure 5:
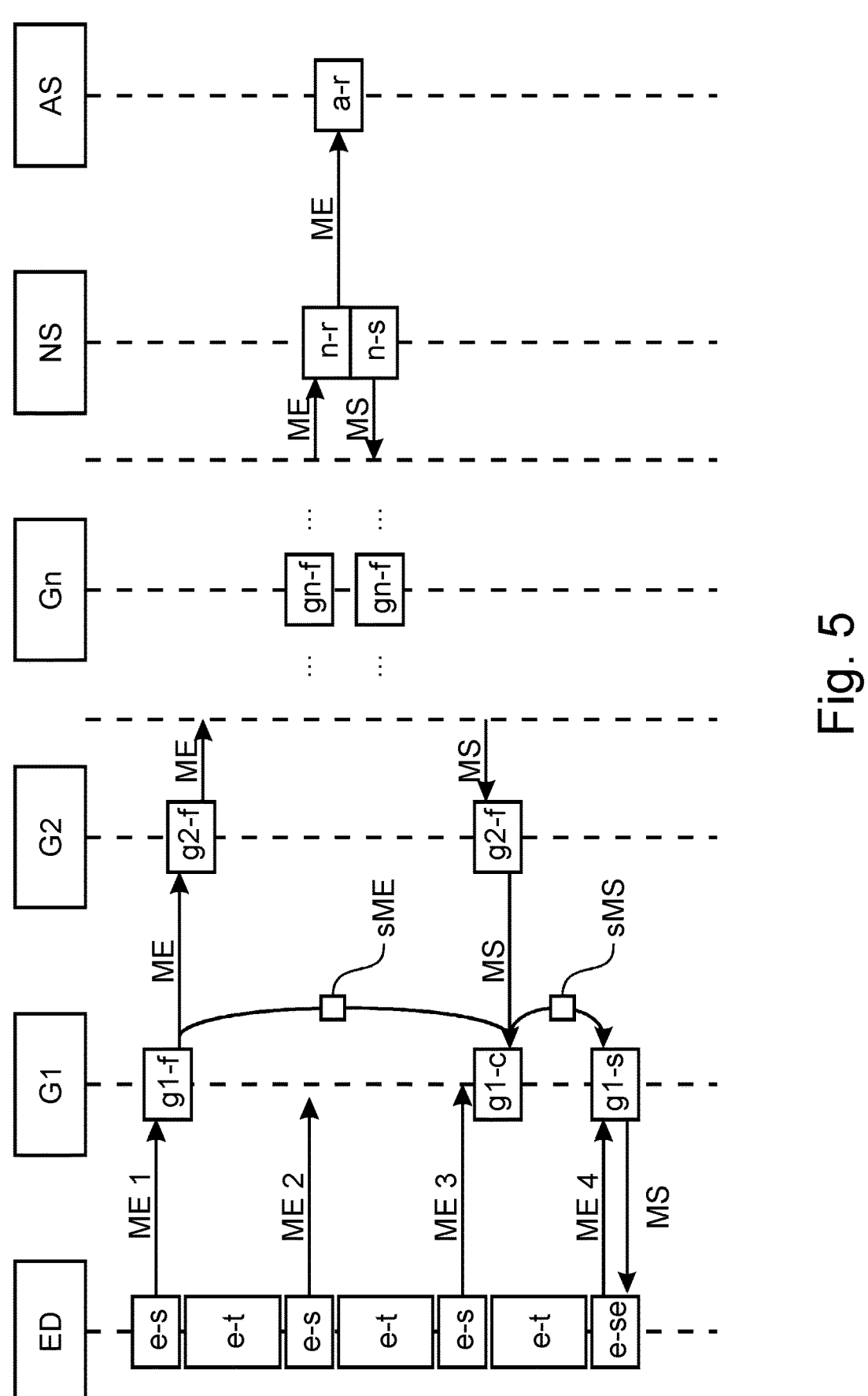
Figure 6:
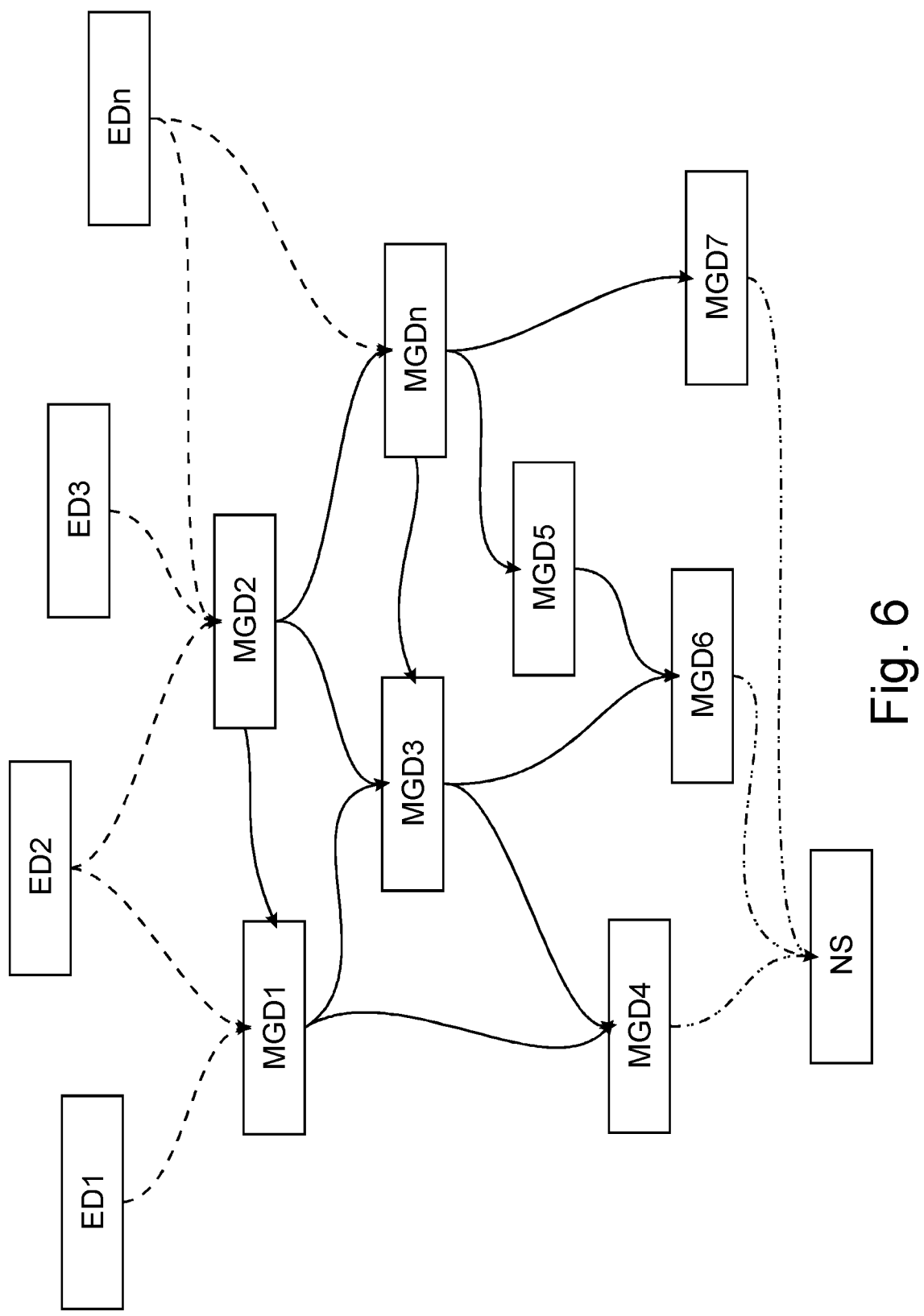
Figure 7B:
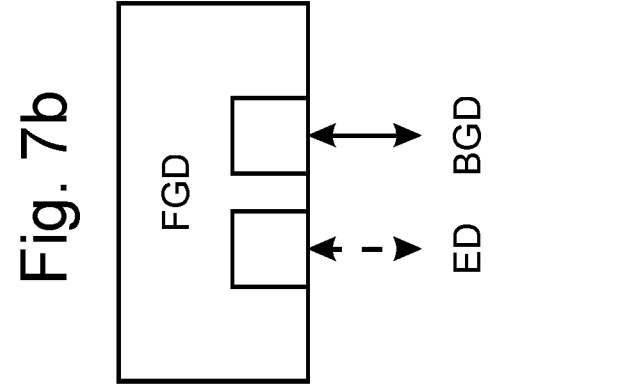
Figure 7D:
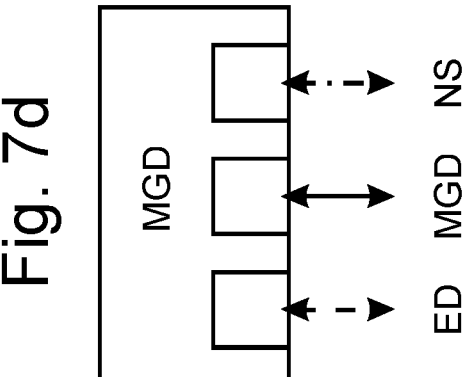
Figure 7A:
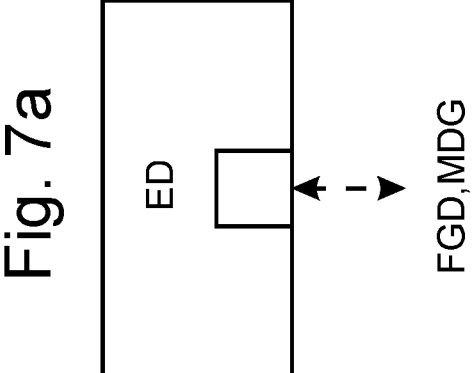
Figure 7C:
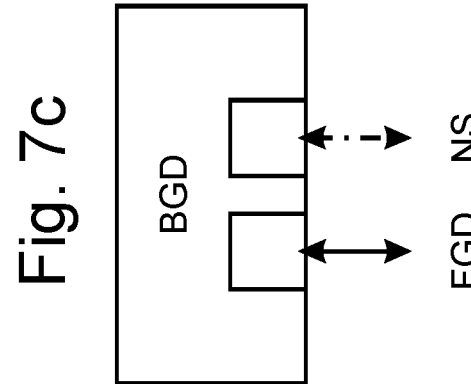
Figure 8:
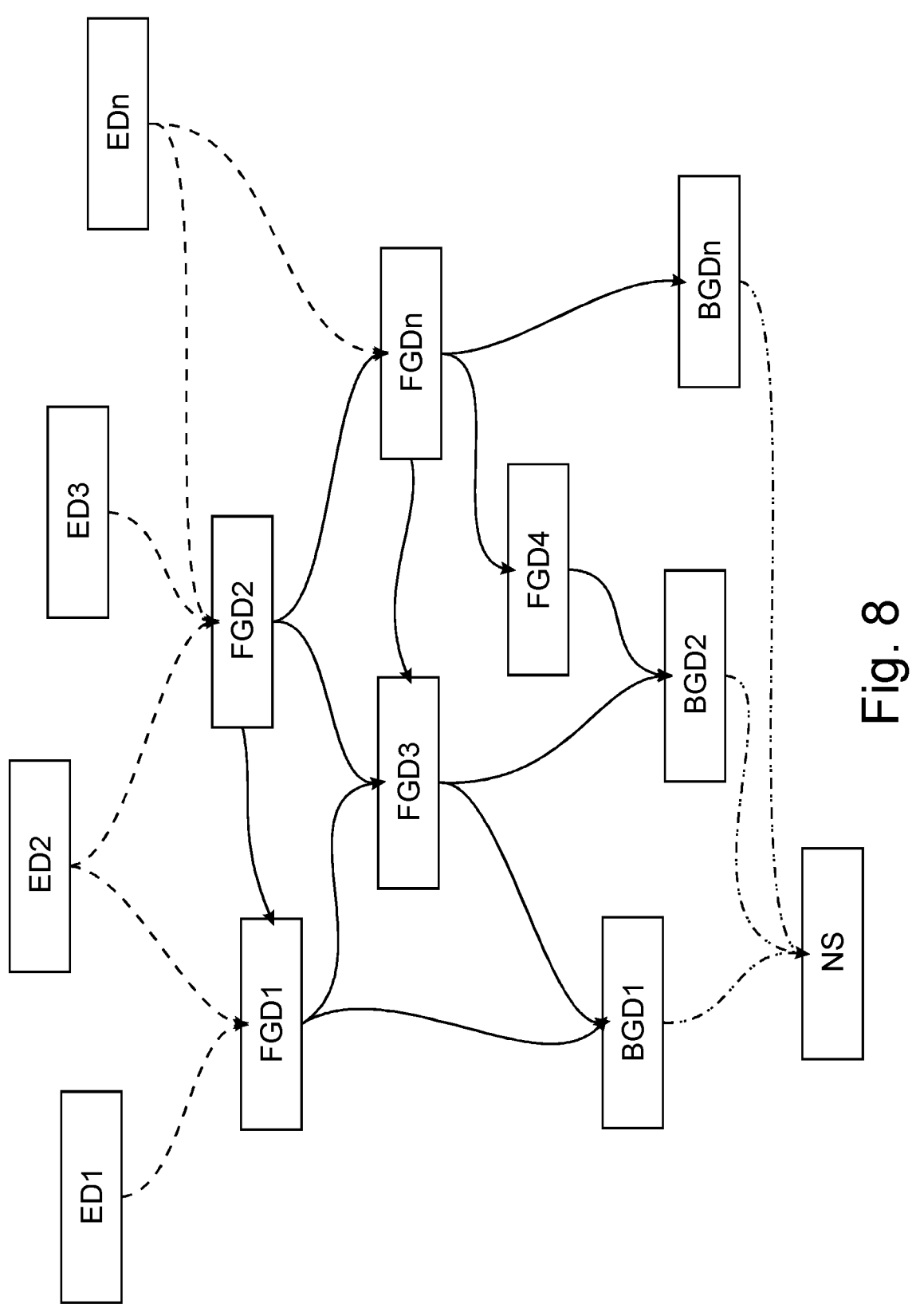
Figure 9:
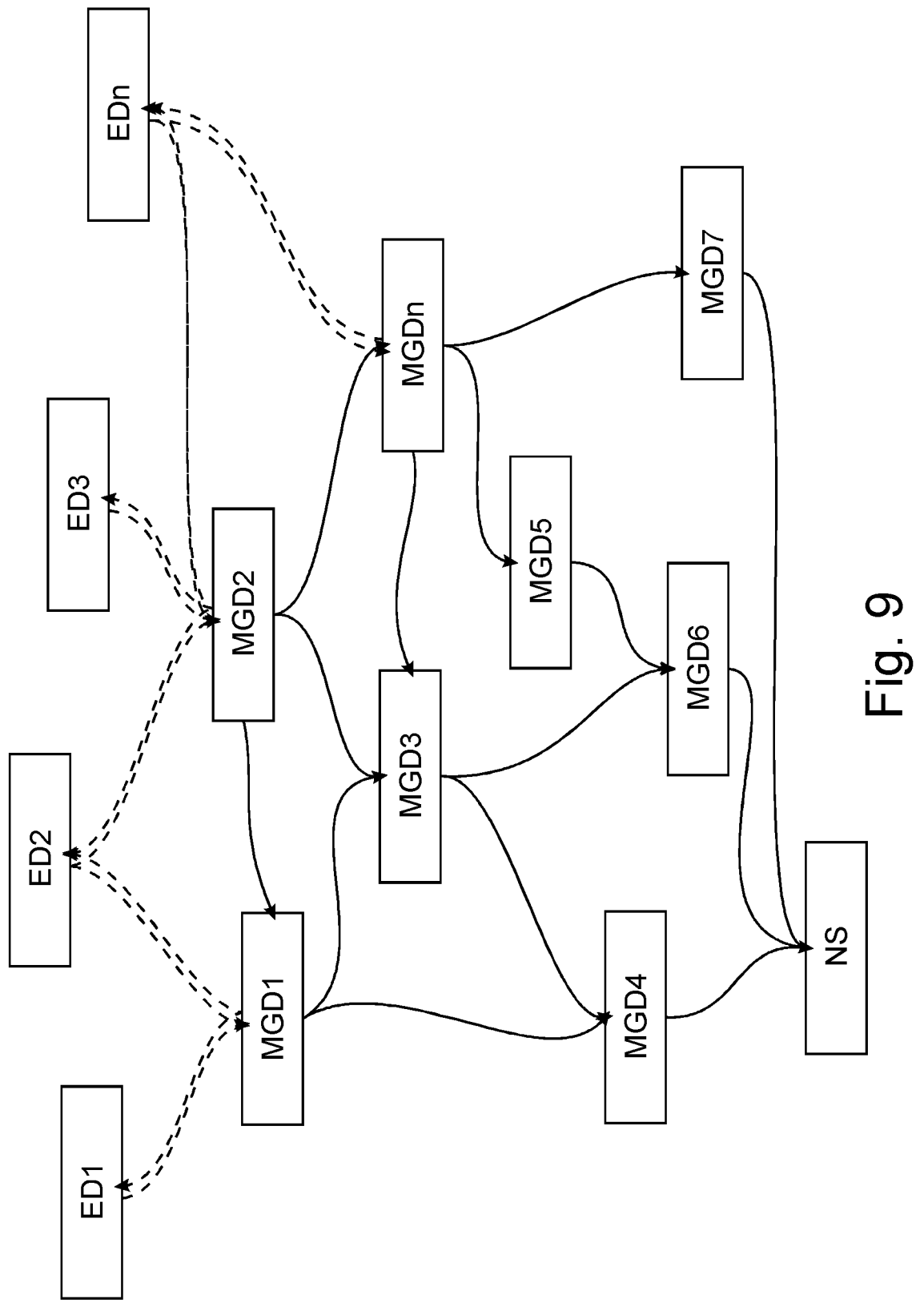

FIG. 4 Sequence diagram of LoRaWAN mesh gateway network with mesh gateways with one sub-server unit—gateway message FIG. 5 Sequence diagram of LoRaWAN mesh gateway network with mesh gateways with one sub-server unit—fail-entry FIG. 6 LoRaWAN mesh gateway network with end devices, a network server and mesh gateways with a sub-server unit FIG. 7 *a* Schematic structure of an end device FIG. 7 *b* Schematic structure of a first gateway FIG. 7 *c* Schematic structure of a second gateway FIG. 7 *d* Schematic structure of a mesh gateway FIG. 8 LoRaWAN network with end devices, first gateways, second gateways and a network server FIG. 9 LoRaWAN network with end devices, mesh gateways and a network server FIG. 1 shows a standard LoRa network with the typical star topology, in which one or more end devices EDn are connected directly (single hop) via communication using LoRa modulation or FSK modulation FSK to gateways FGD1, FGD2 and communicate with the Internet network server NS using a standard Internet protocol IP.

Figure 2:
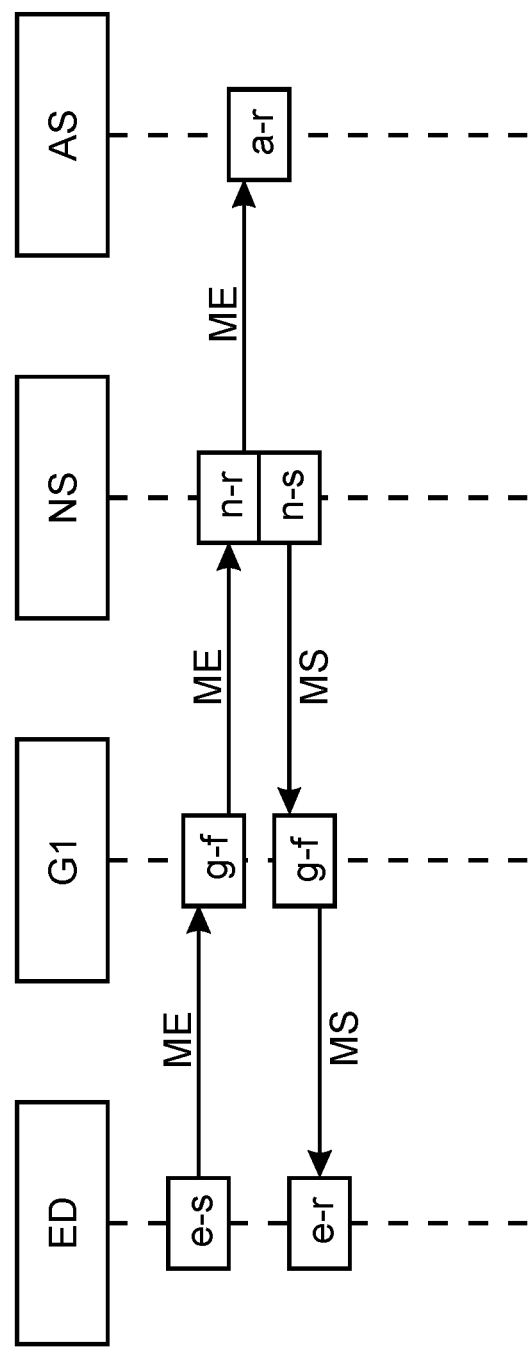

FIG. 2 shows a sequence diagram of a standard LoRaWAN network (see FIG. 1) according to the LoRaWAN protocol. First, a message ME such as a join request is sent from an end device ED to a gateway G1 *e-s*. The gateway G1 forwards this message ME g-f to the network server NS, which on the one hand forwards the message ME to the join server AS and on the other hand generates a response n-r, which is sent back to the gateway G1 *n-s*. The gateway G1 in turn forwards this message g-f to the end device ED. In the star architecture of a standard LoRaWAN network, this communication is very fast because only one gateway G1 is located between the end device ED and the network server NS.

FIG. 3 shows a sequence diagram of a LoRaWAN mesh gateway network 1 that no longer has the typical star architecture. Here, multiple gateways G1, G2, Gn are arranged between the end device ED and the network server NS, not all of which have a single-hop connection to the network server NS. A request ME generated by an end device ED, such as a link check request, must first be routed through multiple gateways G1, G2, Gn g1-f, g2-f before the request can reach a network server NS n-r. There is a multi-hop connection between some end devices ED and the network server NS. The network server NS forwards this message ME n-r to the application server AS and generates a response message MS and sends it back n-s to the next gateway G2. Gateways G1, G2, Gn forward the message g1-f, g2-f back to the end device ED, which receives the response message MS e-r. Depending on how many gateways G1, G2, Gn a message has to be forwarded g1-f, g2-f, gn-f, there is a possibility that the reply message MS does not arrive at the end device ED in time during one of the two receive windows defined according to LoRaWAN. The end device goes into time-out mode if the reply message does not arrive and is only reset after a certain time has elapsed. Since no response message MS could be received by the end device ED, the end device ED resends the request ME. An infinite loop between sending the request ME and a time-out error is the result on the end device ED. An application server in the sense of the present invention may be a server connected to the network server, such as a join server or any other server.

FIG. 4 shows a solution according to the invention in which a gateway G1, G2, Gn comprise a sub-server unit that takes over part of the functionality of a network server NS. In this embodiment, e-s the end device ED sends a join request ME to the next gateway G1. The gateway gMG firstly generates a response message MG and sends it directly back to the end device ED g1-s. The end device ED receives the end device message MG from the gateway G1 within the receive window and remains in proper operation. Parallel to the generation gMG of the end device message MG and its transmission g1-s to the end device ED, the gateway G1 forwards the request ME of the end device ED to the next gateway G2 g1-f. This ensures that both a time-out error at the end device ED is avoided and the request ME of the end device ED is forwarded to the network server NS via the gateways G1, G2 g1-f, g2-f. According to the LoRaWAN protocol, the network server NS receives the request from the end device ED, forwards the request to the application server n-r and generates n-s an end device message MS, which is sent back to the end device ED via the forwarding g1-f, g2-f gateways G1, G2.

FIG. 5 shows the preferred embodiment of the invention. Here, the communication in a very large LoRaWAN mesh gateway network is shown, in which at least some gateways have a sub-server unit that takes over network server functionalities. An end device ED of the LoRaWAN mesh gateway network sends e-s a message ME1 with a check link request to the network server NS. Since it is a very large network, the end device ED's message ME must be forwarded through a large number of gateways G1, G2, Gn g1-f, g2-f, gn-f before the network server NS can receive the message ME1 n-r. The nearest gateway G1 stores information about the sent message ME of the end device ED, which helps the gateway G1 to identify the message ME sME. The network server forwards the message to the application server AS and generates a response message MS, which the network server NS sends back to the end device ED via the plurality of gateways G1, G2, Gn n-s.

In the meantime, the two receive windows as defined by the LoRaWAN protocol have already elapsed, so the end device is put into time-out mode e-t. After the time-out has elapsed, the end device ED again attempts to send e-s the original message ME2 to the network server NS. If again no response message MS is received from the network server NS, the end device again enters the time-out mode e-t until it can reset itself independently. In this embodiment, the end device attempts to send e-s the message ME1, ME2, ME3 three times without being able to receive a response message from the network server NS from the end device ED within the respective receive windows.

During the third time-out e-t, the response message MS of the network server NS reaches the gateway G1 nearest to the end device ED. The sub-server unit SSE of the gateway G1 checks the response message MS of the network server NS and assigns it to the original message ME1 of the end device ED based on the message identification information stored via the original message M1 of the end device ED g1-c and stores sMS the response message MS of the network server NS as well. After resetting the end device ED after the third time-out e-t has elapsed, the end device ED sends the original message ME4 a fourth time e-se. The nearest gateway G1 receives the message, identifies it as identical to the original message ME1, and sends the response message MS received from network server NS and stored on gateway G1 to end device ED. The end device receives e-se the response message MS from the network server NS and continues normal operation.

FIG. 6 shows an embodiment of the invention in which the first gateways G1 and the second gateways G2 are combined in one device. These so-called mesh gateways MGDn consist of a combination of a first gateway G1 and a second gateway G2. The mesh gateways MGDn communicate with each other via multi-hop communication network MHF and at least one mesh gateway MGD is connected to the network server NS via the standard Internet protocol IP.

While in a conventional standard LoRa network end devices EDn are directly connected to gateways Gn by means of a single-hop communication link, according to the invention the gateways Gn are divided into several first gateways G1 and second gateways G2. The first gateways G1 now communicate with each other via a multi-hop communication network MHF, while at least one of the first gateways G1 also communicates with a second gateway G2. This gateway then sends data directly to the network server NS using an Internet protocol IP. Alternatively, and in a particularly advantageous embodiment, the first gateways G1 and the second gateways G2 are combined in one device, namely in so-called "mesh gateways" MGD. Here, too, the integrated first gateways G1 communicate with each other by means of a multi-hop communication network MHD, while at least one integrated second gateway G2 is connected to the network server NS via the standard Internet protocol IP.

FIG. 7 shows schematically the structure of the components arranged in the network. An end device ED (FIG. 7 *a*) has, in addition to the other components owed to the actual function of the end device, a communication port only to a gateway G1, MGD, the connection is wireless via LoRa (chip frequency spread modulation) or FSK (frequency modulation).

A first gateway G1 (FIG. 7 *b*) has a communication port both to an end device ED for exchanging data and sending a gateway message MG, such as an ACK signal, and to a second gateway G2. In particular, the connection to the second gateway G2 may be a multi-hop meshed network, while the connection to the end device ED is a single-hop connection. The two communication ports of the first gateway G1 use different communication channels, so that the sender can be assigned via the communication channel used.

A second gateway G2 (FIG. 7 *c*) has a communication port to a first gateway G1 and to the network server NS, respectively. The second gateway G2 then sends the data of an end device ED, which was sent to the second gateway G2 via single-hop and multi-hop connection, directly to the network server NS using an Internet protocol IP. The communication of the second gateway G2 with the network server NS may be wired or wireless. Each communication port of the second gateway G2 uses its own communication channel which is different from the other communication ports.

A mesh gateway MGD is a combination of a first gateway G1 and a second gateway G2 in one device. Therefore, the mesh gateway MGD has one communication port each to an end device ED for exchanging data and sending the gateway message, to a gateway G1, MGD, and to the network server NS. The communication ports of the mesh gateway MGD use different communication channels, so that the sender can be assigned via the communication channel used.

FIG. 8 shows another embodiment of the invention in the LoRaWAN network, in which it divides the gateways Gn into a plurality of first gateways G1 *n* and at least one second gateway G2*n*, wherein the first gateways G1*n* communicate with each other via a multi-hop communication network MHF and at least one of the first gateways G1*n* communicates with a second gateway G2*n*, which then exchanges data directly with the network server NS using Internet Protocol IP. A first gateway G1*n* has a sub-server unit and, upon receiving a message from an end device EDn, sends a gateway message MG to the end device EDn that sent the message. This ensures that a message from the end device EDn to a first gateway G1*n* is correctly sent to the mesh gateway MGDn. The end device does not require to have a permanently active download receive window and therefore be permanently active, as in the case of a class C end device, but can also be, for example, a class A or B end device according to the LoRaWAN specification. The power consumption and the operating time of the end device EDn are thus increased. The failure of an end device EDn due to internal error is avoided.

FIG. 9 shows an embodiment of the invention in which first gateways G1 and second gateways G2 are combined in one device. These so-called mesh gateways MGDn consist of a combination of the first gateways G1 and the second gateways G2. The mesh gateways MGDn communicate with each other by means of multi-hop communication network MHF and at least one mesh gateway MGD is connected to the network server NS via the standard Internet protocol IP. A mesh gateway MGDn has a sub-server unit and, upon receiving a message from an end device EDn, sends a gateway message MG to the end device EDn that sent the message. This ensures that a message from the end device EDn to a mesh gateway MGDn is correctly sent to the mesh gateway MGDn. The end device does not require to have a permanently active download receive window and therefore be permanently active, as in the case of a class C end device, but can also be, for example, a class A or B end device according to the LoRaWAN specification. The power consumption and the operating time of the end device EDn are thus increased. The failure of an end device EDn due to internal error is avoided.

As shown in the examples, this type of communication and division of the gateways Gn into first gateways G1*n* and second gateways G2*n* considerably expands the LoRaWAN network, and LoRaWAN-compatible end devices EDn can still be used, which can be distributed and networked far into impassable areas that cannot be reached with conventional communication networks.

The first gateways G1 and the second gateways G2 are connected to each other via a meshed multi-hop communication network MHD. This means that the first gateway G1 does not require a direct Internet connection 8, while it communicates with the standard end devices EDn. The range of the LoRaWAN network is significantly extended because the first gateway G1 is in communication with the second gateways G2 via the meshed multi-hop communication network MHF and can forward the data from the end devices EDn to the Internet network server NS. This removes the range limitation of the direct connection between end devices EDn and gateways Gn provided by LoRaWAN standard.

At the same time, the invention provides complete compatibility with commercially available LoRa end devices EDn because the first gateway G1 and the standard LoRaWAN communication protocol comply with the standard LoRa communication link. On the other hand, the second gateway G2 also uses the standard Internet protocol IP to communicate with the LoRAWAN network server NS, so complete compatibility is also established on this side. The invention therefore enables range extension of LoRAWAN networks in which it interposes a multi-hop communication network MHF by means of first gateways G1, thereby maintaining full compatibility with the LoRaWAN specification. This type of network is particularly suitable in remote, rural areas where there is neither wired Internet connectivity nor suitable cellular network coverage (5G, 4G/LTE, 3G) and thus the star-shaped network topology envisaged by the LoRa network, in which the gateway Gn requires a direct Internet connection IP, is not possible.

Of course, the invention is not limited to the embodiments shown. Further embodiments are possible without departing from the basic idea.

15

REFERENCE LIST

1 LoRaWAN mesh gateway network
ED, EDn end devices
G, Gn Gateways
NS Internet Network Server
IP Internet protocol
G1, G1n First gateways
G2, G2n Second gateways
MHF Multi-hop communication network
MGD Mesh gateways
FSK FSK modulation
WN Wired connection
e-s Message sending from end device
e-r Message reception from the end device
e-t Time-out error on the end device
e-se Message sending and receiving from end device
g-f, g1-f, g2-f Message forwarding from gateway
g1-s Message sending from gateway
g1-c Message check from gateway
n-r Message reception on the network server
n-s Message sending from the network server
a-r Message reception on the application server
gMG Generating a gateway message
sME Saving an end device message
ME End device message
MS, MS1, MS2, Server message
MS3, MS4
MG Gateway message

The invention claimed is:

1. A method for communication in a Long Range Wide Area Network ("LoRaWAN") mesh gateway network (1),
   wherein the LoRaWAN mesh gateway network (1) has multiple end devices (ED), multiple gateways (Gn) and a network server (NS),
   characterized in that
   one of the gateways (Gn) performs server functions of the communication method provided for the network server (NS) according to the LoRaWAN protocol
   wherein an end device message (ME) generated by an end device (ED) and sent to the gateway (G1) is stored on the gateway (G1),
   whereas the end device message (ME) stored on the gateway (G1) is not deleted from the memory of the gateway until a server message (MS) associated with the end device message (ME) has been sent from the network server (NS) to the end device (ED).

2. The method for communication in a LoRaWAN mesh gateway network (1) according to claim 1
   characterized in that
   the LoRaWAN mesh gateway network (1) has a first gateway (G1) and a second gateway (G2),
   wherein the first gateway (G1) does not have a single-hop connection to the network server,
   wherein the server functions of the communication method are performed by the first gateway (G1).

3. The method for communication in a LoRaWAN mesh gateway network (1) according to claim 1,
   characterized in that
   a message generated by the network server (NS) and sent to the gateway (G1) is stored on the gateway (G1).

4. The method for communication in a LoRaWAN mesh gateway network (1) according to claim 3
   characterized in that
   the server message (MS) stored on the gateway (G1) is not deleted from the memory of the gateway until an end device message (ME) associated with the server message (MS) has been received by the gateway (G1).

5. The method for communication in a LoRaWAN mesh gateway network (1) according to claim 4,
   characterized in that
   the server message (MS) stored on the gateway (G1) is not deleted from the memory of the gateway until the stored server message (MS) has been sent from the gateway (G1) to the end device (ED).

6. The method for communication in a LoRaWAN mesh gateway network (1) according to claim 3,
   characterized in that
   the server message (MS) stored on the gateway (G1) is sent from the gateway (G1) to the end device (ED) within a receive window of the end device (ED),
   whereas the receive window of the end device (ED) is a receive window generated by repeatedly sending an end device message (ME) to the gateway (G1),
   whereas the repeated sending of an end device message (ME) to the gateway (G1) is performed after a timeout of the end device (ED),
   whereas the end device (ED) timeout occurs as a result of an unanswered end device message (ME) within the two receive windows defined according to the LoRaWAN protocol,
   whereas a gateway message (MG) is generated on the gateway (G1).

7. The method for communication in a LoRaWAN mesh gateway network (1) according to claim 6
   characterized in that
   the gateway message (MG) is generated after receiving an end device message (ME) from an end device (ED),
   whereas the end device message (ME) is a message to which the end device (ED) expects a response from the network server (NS) according to the LoRaWAN protocol,
   whereas the end device message (ME) is forwarded from the gateway (G1) to the network server (NS) or another gateway (G2, Gn).

8. The method of communicating in a LoRaWAN mesh gateway network (1) according to claim 6,
   characterized in that
   the gateway message (MG) is sent to the end device (ED)
   whereas the sending of the gateway message (MG) from the gateway (G1) to the end device (ED) takes place within the receive windows defined by the LoRaWAN protocol.

9. The method of communicating in a LoRaWAN mesh gateway network (1) according to claim 6,
   characterized in that
   the sending of the gateway message (MG) to the end device (ED) and/or the end device message (ME) to the gateway (G1) is performed via a single-hop connection.

10. The method for communication in a LoRaWAN mesh gateway network (1) according to claim 6,
    characterized in that
    the gateway message is generated and/or sent by a first gateway (G1).

11. The method for communication in a LoRaWAN mesh gateway network (1) according to claim 6,
    characterized in that
    at least a second gateway (G2) communicates with the network server (NS) IP connection.

12. A Long Range Wide Area Network ("LoRaWAN") mesh gateway network (1)

comprising at least one network server (NS), multiple gateways (G) and multiple end devices (ED), characterized in that a gateway (G1) comprises a sub-server unit (SSE) equipped with a program and/or operating system and/or firmware suitable for performing functionalities intended for the network server according to LoRaWAn protocol, wherein one end device is a class A or class B end device according to LoRaWAN specification, wherein an end device message (ME) generated by an end device (ED) and sent to the gateway (G1) is stored on the gateway (G1), whereas the end device message (ME) stored on the gateway (G1) is not deleted from the memory of the gateway until a server message (MS) associated with the end device message (ME) has been sent from the network server (NS) to the end device (ED).

13. The LoRaWAN mesh gateway network (1) according to claim 12, characterized in that the sub-server unit (SSE) comprises a memory and/or a processor.

14. The LoRaWAN mesh gateway network (1) according to claim 12, characterized in that the LoRaWAN mesh gateway network (1) has different gateway types (Gn), whereas the LoRaWAN mesh gateway network (1) comprises a first gateway (G1) and a second gateway (G2).

15. The loRaWAN mesh gateway network (1) according to claim 14, characterized in that the first gateway (G1) comprises the sub-server unit (SSE).

16. The LoRaWAN mesh gateway network (1) according to claim 14, characterized in that the first gateway (G1) has a first gateway communication port for communication with an end device (ED) and a second gateway communication port for communication with another first gateway (G1) and/or a second gateway (G2).

17. The LoRaWAN mesh gateway network (1) according to claim 14, characterized in that each first gateway (G1) is adapted for wireless point-to-point communication with a plurality of end devices (EDn) using single-hop LoRa or FSK communication using the LoRaWAN protocol.

18. The LoRaWAN mesh gateway network (1) according to claim 14, characterized in that the first gateway (G1) and the second gateway (G2) are combined with a plurality of mesh gateway (MGD), and at least one of the mesh gateway (MGD) does not have a direct IP connection (IP).

19. The LoRaWAN mesh gateway network (1) according to claim 14, characterized in that a second gateway (G2) is provided for communicating by means of a standard IP link and using the LoRaWAN protocol with the network server (NS), whereas the second gateway (G2) has a first gateway communication port for communication with a network server (NS) and a second gateway communication port for communication with a first gateway (G1).

20. The LoRaWAN mesh gateway network (1) according to claim 14, characterized in that the first gateways (G1) are each integrated with a second gateway (G2) in a mesh gateway (MGD).

21. The LoRaWAN mesh gateway network (1) according to claim 12, characterized in that the LoRaWAN mesh gateway network (1) is a multi-hop communication network.

* * * * *